May 12, 1959 P. J. DECUIR 2,886,369
WIRE FISHING TOOL
Filed Feb. 27, 1957
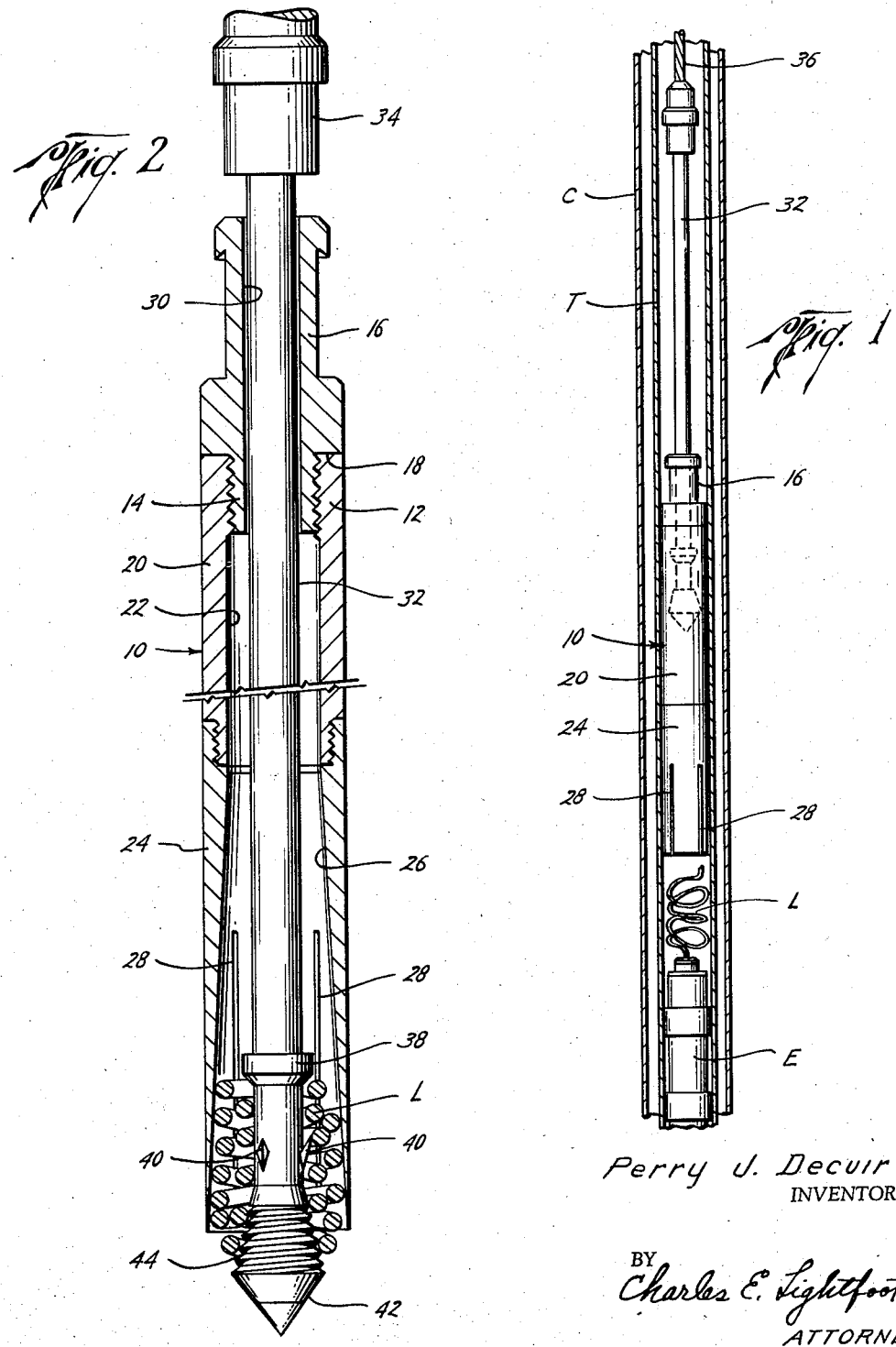
Perry J. Decuir
INVENTOR.
BY Charles E. Lightfoot
ATTORNEY

United States Patent Office 2,886,369
Patented May 12, 1959

2,886,369

WIRE FISHING TOOL

Perry J. Decuir, New Iberia, La.

Application February 27, 1957, Serial No. 642,907

4 Claims. (Cl. 294—86)

This invention relates to a wire fishing tool and more particularly to apparatus for use in well bores for the removal therefrom of broken or lost wire lines and the like.

The invention finds particular appreciation in connection with wire line or cable tool equipment used in the production and operation of well, such as oil and gas wells, in which a wire line, cable or the like is employed for the operation of various tools, instruments or other equipment in a well bore. In conducting wire line operations in wells breaking or loss of the line in the well bore often occurs, making it necessary to carry out time consuming and expensive fishing operations to recover the line before work on the well can be resumed. The use of fishing tools of usual construction for the purpose of recovering broken or lost wire lines is also attended by the disadvantage that the lost line is difficult to catch and there is danger that the line may be cut into small pieces due to the tendency of the line to form coils or loops in the well bore, through which the fishing tool may pass and which may be severed by becoming wedged between the tool and a surrounding well pipe or casing. At times a lost line may be caught by the fishing equipment at a point far below the severed or lost end of the wire, which often results in "balling" of the wire above the fishing tool, so that the wire causes jamming or wedging of the equipment in the bore.

The present invention has for an important object the provision of wire line recovering equipment, whereby the above disadvantages of fishing equipment of conventional construction are overcome, and which embodies means for recovering the lost line in a substantially untangled and re-usable condition.

Another object of the invention is to provide wire line recovering equipment embodying wire grappling means and means for preventing the lost line from passing between the grappling means and a surrounding well pipe or casing whereby balling or cutting of a tangled or coiled line is prevented.

A further object of the invention is the provision of wire line recovering equipment including an outer tubular barrel whose lower end is open, and an inner mandrel in and longitudinally movable in the barrel, and having wire grappling means at its lower end shaped to catch a lost line and by which the line may be drawn into the barrel and securely gripped between the barrel and mandrel.

Another object of the invention is to provide wire line recovering equipment of the kind referred to which includes means for preventing the lost line from passing between or becoming wedged between the barrel and a surrounding well pipe or casing.

A further object of the invention is the provision of wire line recovering equipment which is of simple design and rugged construction and which is easily actuated and certain in operation.

The above and other important objects and advantages of the invention may best be understood from the following detailed description, constituting a specification of the same, when considered in conjunction with the annexed drawings, wherein:

Figure 1 is a fragmentary, side elevational view illustrating a preferred embodiment of the invention and showing the same in a well pipe in a well, the parts being shown in releasing position at the commencement of a fishing operation; and Figure 2 is a side elevational view on an enlarged scale and partly in cross-section of the invention as illustrated in Figure 1, the parts being shown in catching position with the lost line gripped between the inner and outer parts.

Referring now to the drawings in greater detail, the invention is illustrated herein in connection with its use in the recovering of a lost wire line in a well having the usual casing C and inner well pipe or tubing T, within which wire line or cable equipment E of any conventional type is located, the lost or broken line being indicated at L.

Upon the occurrence of a break in the line L employed with wire line or cable operated equipment in a well, the lost line has a tendency to fall in the well forming coils or loops therein which may be more or less extended, depending upon the nature and condition of the fluid in the well, the size and condition of the line or other variable factors.

The line recovering apparatus of the invention is intended for use with a wire line whereby the apparatus may be lowered into the well and manipulated therein to engage and grip the lost line to permit the recovery of the lost line and its attached equipment.

The apparatus of the invention comprises an outer part in the form of a tubular barrel 10 having an internally threaded upper end portion 12 within which the lower externally threaded end 14 of a tubular fishing head 16 is threaded. The fishing head 16 may be formed with an external, annular, downwardly facing shoulder 18 positioned for abutting engagement with the upper end of the barrel when the fishing head is screwed into the barrel.

The barrel 10 is preferably formed in two or more threadably connected sections including an upper section 20 having an internal bore 22 which may be cylindrical in shape and a lower section 24 whose internal bore 26 tapers downwardly and outwardly and whose lower end portion is formed with circumferentially spaced, longitudinal slots 28 whereby the lower end of the lower section forms an expansible, somewhat flexible skirt for a purpose to be hereinafter explained.

The fishing head 16 preferably has a bore 30 whose diameter is substantially smaller than the bore 22 of the section 20 of the barrel.

An inner part or mandrel 32 is slidably extended through the fishing head and barrel, which mandrel has at its upper end a cable socket element 34 whereby the mandrel is connected to a cable, wire line, or the like, indicated at 36 whereby the apparatus may be lowered into a well and manipulated therein.

The mandrel 32 is of a diameter to slide easily in the bore 30 of the fishing head and of substantially smaller diameter than that of the bore 22 of the barrel section 20 and the bore 26 of the barrel section 24 to provide an internal annular space between the exterior of the mandrel and the interior of the barrel for the reception of the lost line L which is to be caught by the apparatus.

Near its lower end the mandrel is provided with an external enlargement 38 which is engageable with the lower end of the fishing head 16 in the upper barrel section 20 to limit relative longitudinal movement of the barrel and mandrel in a direction to extend the same, and below the enlargement 38 the mandrel is provided with external barbs or hooks 40 located to hook into or catch the lost line L during the operation of the apparatus. The outer ends of the hooks or barbs 40 may be spaced from the interior of the lower section 24, when the hooks are in the lower portion of the lower section 24, at a distance substantially greater than the diameter of the lost line L. When the hooks or barbs reach a position within the upper portion of the lower section 24 or within the upper section 20, however, the outer ends of the hooks or barbs may be spaced from the interior of the barrel at a distance such that the wire line L will be engaged with the interior of the barrel to prevent the line from becoming disengaged from the hooks or barbs.

At its lower end the mandrel is provided with a downwardly directed cone shaped, guiding point 42, above which an upwardly and inwardly tapering, externally threaded portion 44 is located, below the hooks or barbs 40. The externally threaded portion 44 has a maximum external diameter substantially smaller than the maximum internal diameter of the tapered bore 26, but which is of such size that the external teeth of the portion 44 will engage the line L when the portion 44 is in the upper portion of the bore 26 to grip the line between the portion 44 and the interior of the barrel.

In making use of the invention, constructed and arranged as described above, the tool is lowered into a well from which it is desired to recover a broken or lost wire line or cable, in the condition shown in Figure 1, with the inner and outer parts in their extended positions and the mandrel connected to the wire line or cable 36. The barrel 10 is preferably selected of a size to closely fit the pipe or tubing T within which the lost line L is located, but to slide freely therein, and if the barrel is of substantially smaller diameter than the internal diameter of the tubing, the lower end portion of the lower barrel section 24 may be expanded by bending outwardly the portions between the slots 28 until the lower end of the barrel is in sliding contact with the interior of the tubing.

As the tool is lowered into the well the lower end of the barrel will contact any loops of the lost line L which will then be moved downwardly in the tubing with the tool. During such downward movement of the tool in the well the lower end portion of the barrel will be substantially in contact with the interior of the tubing or will fit the tubing so closely that the wire line will be prevented from getting between the tubing and the barrel. When the tool reaches a position in which the lost line supports the barrel against further downward movement, the mandrel will then move downward in the barrel until the externally threaded portion or head 44 extends downwardly beyond the lower end of the barrel and is guided by the point 42 through some of the loops or coils of the line which will then be caught on the barbs 40. The exertion of an upward pull on the mandrel will then move the mandrel upwardly in the barrel to pull the line into the barrel and wedge some of the loops of the line securely between the interior of the barrel and the exterior of the mandrel. With the line thus connected to the tool the tool may be pulled upwardly to extend the line and use the same to recover the equipment E from the well.

When the line has been recovered it may be easily detached from the tool by moving the mandrel downwardly relative to the barrel to release the line, whereupon the tool will be in condition for immediate reuse.

It will thus be seen that the invention provides a wire line fishing tool which is of simple and economical manufacture and which is easily actuated by manipulation of the wire line or cable to which it is attached.

The invention has been disclosed herein in connection with a certain specific embodiment of the same, but it will be understood that this is intended by way of illustration only and that various changes can be made in the construction and arrangement of the parts without departing from the spirit of the invention or the scope of the appended claims.

Having thus clearly shown and described the invention, what is claimed as new and desired to secure by Letters Patent is:

1. A tool for recovering a wire line from a well bore comprising a mandrel, a tubular barrel surrounding and movable longitudinally on the mandrel and having a lower end portion shaped to receive therein a wire line located below the barrel in a well bore upon downward movement of the barrel in the bore and longitudinally extending, peripherally spaced, end slots in said lower end portion forming flexible end wall portions positioned for sliding contact with the wall of the well bore, means on the barrel and mandrel positioned for engagement to limit relative longitudinal movement of the barrel and mandrel in either direction, means for connecting the mandrel at its upper end to a support for lowering the mandrel and barrel in the well bore, said barrel being engageable at its lower end with the line in the bore to arrest downward movement of the barrel in the bore and to permit downward movement of the mandrel relative to the barrel, said mandrel having a lower end portion extending downwardly beyond the lower end of the barrel when the mandrel reaches its lowermost position in the barrel, and hook means on the mandrel engageable with the line in said lowermost position of the line to cause the line to move with said hook means into the barrel upon upward movement of said mandrel in the barrel from said lowermost position.

2. A tool for recovering a wire line from a well bore comprising a mandrel, means for connecting the mandrel at its upper end to a support for lowering the mandrel into a well bore, a tubular barrel surrounding and movable longitudinally on the mandrel and having longitudinally extending, peripherally spaced end slots in its lower end portion forming flexible end wall portions positioned for sliding contact with the wall of the well bore, said free ends being engageable with a wire line located in the bore below the barrel to guide the line into the barrel and means on the mandrel positioned for coaction with the line and barrel to grippingly engage the line in the barrel upon upward movement of the mandrel in the barrel.

3. A tool for recovering a wire line from a well bore comprising a mandrel, means for connecting the mandrel at its upper end to a support for lowering the mandrel in a well bore, a tubular barrel surrounding and movable longitudinally on the barrel and having an inside face whose diameter increases downwardly toward the lower end of the barrel positioned for engagement with a wire line in the bore to guide the line into the barrel and longitudinally extending peripherally spaced end slots in the lower end portion of the barrel forming flexible end wall portions positioned for sliding contact with the wall of the well bore, said mandrel having an external enlargement positioned to move into the lower end of the barrel upon upward movement of the mandrel in the barrel and having an external upwardly tapering face positioned to coact with said inside face to grippingly engage said line in the barrel and external hook means on the mandrel located above said tapering face in position for engagement with the line in the lowermost position of the mandrel in the barrel to cause the line to move with the hook means into the barrel upon upward movement of the mandrel from said lowermost position.

4. A tool for recovering a wire line from a well bore comprising a mandrel, means for connecting the mandrel at its upper end to a support for lowering the mandrel into a well bore, a tubular barrel surrounding and movable longitudinally on the mandrel and having a lower end portion shaped for engagement with a wire line in the bore to guide the line into the barrel and longitudinally extending peripherally spaced end slots in said lower end portion forming flexible end wall portions positioned for sliding contact with the wall of the well bore and external means on said mandrel positioned for engagement with said line to move the line upwardly with the mandrel into the barrel upon upward movement of the mandrel in the barrel.

References Cited in the file of this patent

UNITED STATES PATENTS

| | | |
|---|---|---|
| 972,340 | Coogan | Oct. 11, 1910 |
| 2,345,727 | Burch | Apr. 4, 1944 |
| 2,650,129 | Axelsen | Aug. 25, 1953 |